E. A. WYNNE-JONES.
EDUCATIONAL TOY.
APPLICATION FILED MAR. 12, 1907.
968,513. Patented Aug. 23, 1910.
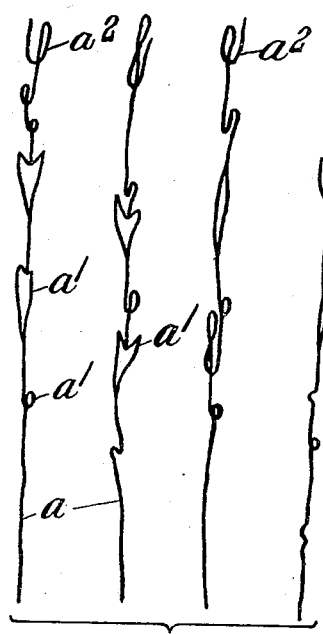
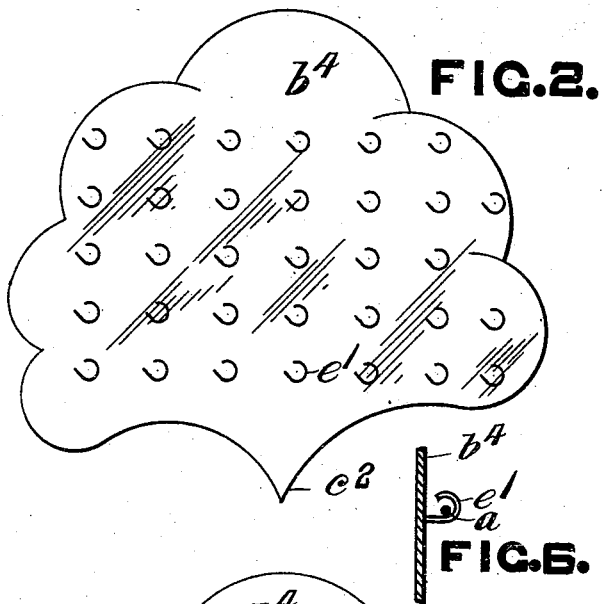
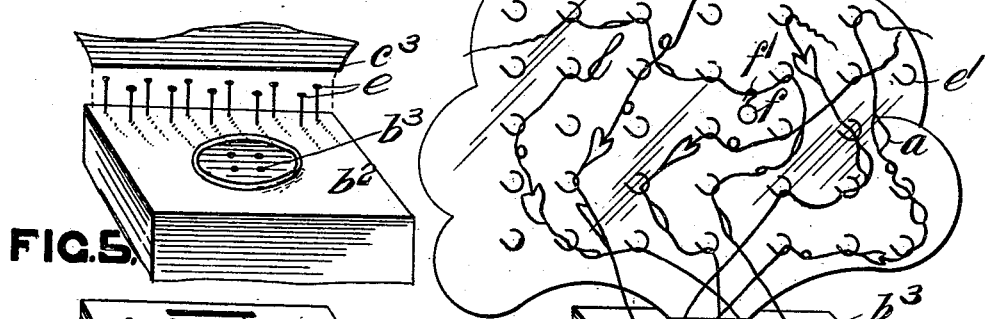
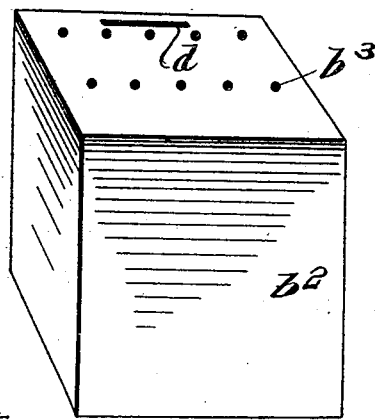

UNITED STATES PATENT OFFICE.

EMILY ANNE WYNNE-JONES, OF ILFORD, ENGLAND.

EDUCATIONAL TOY.

968,513.  Specification of Letters Patent.  Patented Aug. 23, 1910.

Application filed March 12, 1907. Serial No. 361,992.

*To all whom it may concern:*

Be it known that I, EMILY ANNE WYNNE-JONES, a subject of His Majesty the King of Great Britain, residing at Ilford, in the county of Essex, England, have invented an Improvement in Educational Toys, of which the following is a specification.

This invention relates to an educational or kindergarten tree, and has for its object to provide a device of this class which is specially suitable for nature teaching in infant schools and for imparting to the children a knowledge of numbers, in place of the bead-calculators or ball-frames hitherto in use.

My invention consists, briefly, in the provision of a tree-like structure or structures formed of wire or other suitable material, provided with means for the attachment thereto of detachable counters or representations of fruit, birds or the like.

In the accompanying illustrative drawings forming part of this specification, Figure 1 illustrates the form of tree-like members I employ. Fig. 2 is a front face view of a background shown detached. Fig. 3 is a perspective view of a base. Fig. 4 is a perspective view of the complete device. Fig. 5 is a perspective view illustrating a modification. Fig. 6 is a detail sectional view illustrating the manner of connecting the tree members to the background, the background being shown in section.

Referring to these said drawings, $a$ represents a number of independent pieces of wire or its equivalent, bent, at the upper parts, into the form of loops $a^1$ and end hooks $a^2$, such loops being made in some cases to follow the conformation of leaves, while in other cases the said members are given the conventional form of twigs and branches as shown. The said tree members $a$ are independent of each other and may be handled separately, their free lower end portions being adapted to enter suitable perforations $b^3$ formed in the top of a cube or other suitable block $b^2$, which block forms a supporting base both for the tree members and for a background $b^4$. The background $b^4$ may be formed of card-board or other suitable material and has preferably the conventional outline of a leaf, the lower pointed end $c^2$ projecting into a suitable slot $d$ formed in the base $b^2$ and shown in Fig. 3. The tree members $a$ are held in place upon the background $b^4$ by means of hooks $e'$ carried by said background.

In Fig. 5 I have shown a slight modification in which the background is secured to the base $b^2$ by means of two rows of pins $e$, the pins of one row being offset with respect to those of the other, and the background rests between said rows. In such construction the background $b^4$ is provided with a straight lower edge to rest upon the base $b^2$ instead of being brought to a point. Perforations $b^3$ may be arranged upon the base $b^2$ in any desired manner, extending in rows across the top of the base as shown in Figs. 3 and 4, or they may be grouped in the central portion of the base as shown in the modified form illustrated in Fig. 5.

In connection with the tree-like members aforesaid I provide suitable counters, such as, for instance, the berry $f$, which counters are provided with hooks $f^1$ or their equivalents in order to permit of them being removably hung upon the branches of the tree members aforesaid, for the purpose hereinbefore referred to.

It will be understood that the several members comprising my invention may be made of any suitable materials and dimensions, while they may be suitably colored or ornamented or left plain, whichever is desirable or convenient.

What I claim and desire to secure by Letters Patent is:—

A device of the kind described consisting of a base, independent flexible members detachably connected to said base, said members being bent to imitate leaves and twigs, a common support for said flexible members, said members being adapted to intertwine, and separate pieces imitating fruit adapted to be detachably connected to any of said flexible members.

In testimony whereof I have signed my name to this specification in the presence of two subscribing witnesses.

EMILY ANNE WYNNE-JONES.

Witnesses:
 ALFD. A. THORNTON,
 M. G. SAYHOW.